(12) United States Patent
Banham et al.

(10) Patent No.: US 11,174,816 B2
(45) Date of Patent: Nov. 16, 2021

(54) BYPASS DUCT CONFORMAL HEAT EXCHANGER ARRAY

(71) Applicant: Rolls-Royce Corporation, Indianapolis, IN (US)

(72) Inventors: Christopher Banham, Indianapolis, IN (US); Rex M. Little, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 184 days.

(21) Appl. No.: 16/284,597

(22) Filed: Feb. 25, 2019

(65) Prior Publication Data

US 2020/0271073 A1 Aug. 27, 2020

(51) Int. Cl.
| | | |
|---|---|---|
| B64D 33/08 | (2006.01) | |
| F02K 3/06 | (2006.01) | |
| F02K 3/02 | (2006.01) | |
| F02C 7/18 | (2006.01) | |
| F02K 3/115 | (2006.01) | |
| B64D 33/02 | (2006.01) | |

(52) U.S. Cl.
CPC ............... *F02K 3/06* (2013.01); *B64D 33/08* (2013.01); *F02C 7/18* (2013.01); *F02K 3/025* (2013.01); *F02K 3/115* (2013.01); *B64D 2033/024* (2013.01); *B64D 2033/0286* (2013.01); *F05D 2260/213* (2013.01); *F05D 2260/232* (2013.01)

(58) Field of Classification Search
CPC ...... F02C 7/18; F02C 6/08; F02C 9/18; F02K 3/06; F02K 3/025; F02K 3/115; B64D 33/08
See application file for complete search history.

(56) References Cited

U.S. PATENT DOCUMENTS

| | | |
|---|---|---|
| 4,187,675 A | 2/1980 | Wakeman |
| 4,254,618 A | 3/1981 | Elovic et al. |
| 5,123,242 A | 6/1992 | Miller |
| 5,163,285 A | 11/1992 | Mazeaud et al. |
| 5,269,135 A | 12/1993 | Alexander et al. |
| 6,106,229 A | 8/2000 | Nikkanen et al. |
| 6,324,828 B1 | 12/2001 | Willis et al. |
| 6,550,253 B2 | 4/2003 | Mortzheim et al. |
| 6,672,072 B1 | 1/2004 | Giffin, III |
| 7,823,389 B2 | 11/2010 | Seitzer et al. |
| 7,997,061 B2 | 8/2011 | Marche |
| 8,181,443 B2 | 5/2012 | Rago |
| 8,266,889 B2 | 9/2012 | Coffinberry |

(Continued)

FOREIGN PATENT DOCUMENTS

| | | |
|---|---|---|
| EP | 1876328 | 1/2008 |
| EP | 2085599 | 8/2009 |

(Continued)

*Primary Examiner* — Steven M Sutherland
*Assistant Examiner* — Thuyhang N Nguyen
(74) *Attorney, Agent, or Firm* — Barnes & Thornburg LLP (57) ABSTRACT

A gas turbine engine coupled to an aircraft includes an engine core arranged axially along an axis, a bypass duct arranged circumferentially around the engine core to define a bypass channel, and a heat exchanger system. The bypass channel is arranged to conduct bypass air around the engine core to provide thrust for the gas turbine engine. The heat exchanger system is configured to provide cooling for the engine core.

18 Claims, 5 Drawing Sheets

(56) References Cited

U.S. PATENT DOCUMENTS

| | | | |
|---|---|---|---|
| 8,307,662 | B2 | 11/2012 | Turco |
| 8,387,362 | B2 | 3/2013 | Storage et al. |
| 8,397,487 | B2 | 3/2013 | Sennoun et al. |
| 8,490,382 | B2 * | 7/2013 | Zysman .................... F02C 7/14 |
| | | | 60/226.3 |
| 9,045,998 | B2 * | 6/2015 | Lo ........................... F02K 3/115 |
| 9,212,623 | B2 | 12/2015 | Murphy et al. |
| 9,303,526 | B2 | 4/2016 | Chir et al. |
| 10,036,329 | B2 * | 7/2018 | Suciu ....................... F02K 3/04 |
| 10,494,949 | B2 * | 12/2019 | Rambo ................. F01D 17/145 |
| 2007/0245738 | A1 | 10/2007 | Stretton et al. |
| 2007/0277888 | A1 | 12/2007 | Scanlon |
| 2008/0006021 | A1 | 1/2008 | Schwarz |
| 2013/0164115 | A1 | 6/2013 | Sennoun |
| 2013/0219920 | A1 | 8/2013 | Suciu et al. |
| 2014/0208769 | A1 | 7/2014 | Bourassa et al. |
| 2014/0250895 | A1 | 9/2014 | McMahon et al. |
| 2015/0300266 | A1 | 10/2015 | Glahn et al. |
| 2016/0369697 | A1 | 12/2016 | Schwarz et al. |
| 2017/0044984 | A1 | 2/2017 | Pesyna et al. |
| 2017/0074172 | A1 | 3/2017 | Little |
| 2018/0058473 | A1 | 3/2018 | Kenworthy et al. |

FOREIGN PATENT DOCUMENTS

| | | |
|---|---|---|
| EP | 2256294 | 12/2010 |
| EP | 31606646 | 12/2016 |
| GB | 2474567 | 4/2011 |
| WO | 2014051678 | 4/2014 |
| WO | 2014055152 | 4/2014 |
| WO | 2014120125 | 8/2014 |

\* cited by examiner

BYPASS DUCT CONFORMAL HEAT EXCHANGER ARRAY

STATEMENT REGARDING FEDERALLY SPONSORED RESEARCH OR DEVELOPMENT

Embodiments of the present disclosure were made with government support under Contract No. NNC14CA29C NASA. The government may have certain rights.

FIELD OF THE DISCLOSURE

The present disclosure relates generally to gas turbine engines, and more specifically to heat exchanger systems of gas turbine engines.

BACKGROUND

Power systems used in some aircrafts include gas turbine engines that have an engine core and a fan operable to generate thrust for moving the aircraft. To reduce the operating temperatures of components of the engine core, pressurized air moving through the engine may be used to cool these components directly or indirectly using a heat exchanger. The space constraints associated with gas turbine engines present challenges to successful integration and placement of a heat exchanger with significant cooling power.

SUMMARY

The present disclosure may comprise one or more of the following features and combinations thereof.

A gas turbine engine may include a power system, a bypass duct, and a heat exchanger system. The power system may include and engine core and a fan. The engine core may have a compressor, a combustor, and a turbine arranged axially along an axis. The fan may be coupled with the engine core and configured to be driven by the engine core to produce bypass air. The bypass air may provide thrust for propelling the gas turbine engine during operation of the gas turbine engine.

In some embodiments, the bypass duct may be arranged circumferentially around the engine core to define a bypass channel. The bypass channel may be arranged to conduct the bypass air around the engine core during operation of the gas turbine engine. The bypass duct may have a radially outer wall and a radially inner wall. The radially outer wall may define an outer boundary of the bypass channel. The radially inner wall may be spaced apart radially from the radially outer wall relative to the axis. The radially outer wall may define an inner boundary of the bypass channel.

In some embodiments, the heat exchanger system may be located radially between the inner boundary of the bypass channel and the engine core. It may be that, no portion of the heat exchanger system extends into the bypass channel. The heat exchanger system may configured to receive a portion of the bypass air from the bypass channel. The heat exchanger system may configured to transfer heat to the portion of the bypass air. The heat exchanger system may configured to conduct the portion of the bypass air back into the bypass channel. The heated portion of the bypass air may provide some of the thrust for propelling the gas turbine engine.

In some embodiments, the heat exchanger system may include an inlet duct, a heat exchanger, and an outlet duct. The inlet duct may be located radially inward of the bypass channel. The inlet duct may define an inlet that opens radially outwardly into the bypass channel. The heat exchanger may be coupled with the inlet duct. The outlet duct may be located radially inward of the bypass channel. The outlet duct may define an outlet that opens radially outwardly into the bypass channel.

In some embodiments, the inlet duct may include a fore end, an aft end, and an inlet duct body. The fore end may be tangent with the radially inner wall of the bypass duct. The aft end may be coupled with the heat exchanger. The inlet duct body may extend from the fore end of the inlet duct in the aft direction and radially inwardly toward the axis to the aft end of the inlet duct. The inlet duct may diverge as it extends in the aft direction.

In some embodiments, the outlet duct may include a fore end, an aft end, and an outlet duct body. The fore end may be coupled with the heat exchanger. The aft end may be tangent with the radially inner wall of the bypass duct. the outlet duct body may extend from the fore end of the outlet duct in the aft direction and radially outwardly away from the axis to the aft end of the outlet duct. The outlet duct may converge as it extends in the aft direction.

In some embodiments, the heat exchanger system may include an ejector. The ejector may be configured to inject secondary air into the outlet duct to increase the mass flow of air included in the portion of the bypass air received by the inlet duct and conducted through the heat exchanger system. The ejector may fluidly connected with the compressor. The secondary air may be bleed air from the compressor.

In some embodiments, the gas turbine engine may include a valve and a controller. The valve may be in fluid communication with the ejector and the compressor. The controller may be connected with the valve. The controller may be configured to compare a pressure of an inlet of the bypass channel and a pressure of an outlet of the bypass channel. The controller may be configured to open the valve if the difference between the pressure of the inlet of the bypass channel and the pressure of the outlet of the bypass channel is less than or equal to a predetermined value. The controller may be configured to close the valve if the difference between the pressure of the inlet of the bypass channel and the pressure of the outlet of the bypass channel is greater than the predetermined value.

According to another aspect of the present disclosure, a gas turbine engine adapted for use with an aircraft may include an engine core, a bypass duct, and a heat exchanger system. The engine core may be arranged axially along an axis. The engine core may include a compressor, a combustor, and a turbine. The bypass duct may be arranged circumferentially around the engine core to define a bypass channel. The bypass channel may be arranged to conduct bypass air around the engine core. The bypass duct may have a radially outer wall and a radially inner wall. The radially outer wall may define the outer boundary of the bypass channel. The radially inner wall may be spaced apart radially from the radially outer wall relative to the axis to define a first portion of an inner boundary of the bypass channel.

In some embodiments, the heat exchanger system may be formed to define an inlet and an outlet. The inlet may be configured to receive the bypass air. The outlet may be located axially aft of the inlet. The outlet may be configured to conduct the bypass air out of the heat exchanger system and into the bypass channel. The inlet and the outlet of the heat exchanger system may define a second portion of the inner boundary of the bypass channel. the heat exchanger system may include a radially outer wall that defines a segment of the second portion of the inner boundary.

In some embodiments, the heat exchanger system may include an inlet duct, a heat exchanger, and an outlet duct. The inlet duct may define the inlet. The heat exchanger may be coupled with the inlet duct. The outlet duct may be coupled with the heat exchanger. The outlet duct may define the outlet. The inlet duct may diverge as it extends in the aft direction. The outlet duct may converge as it extends in the aft direction. In some embodiments, the inlet duct may be a NACA type inlet. In some embodiments, it may be that no portion of the inlet duct extends radially outward into the bypass channel.

In some embodiments, the heat exchanger system may include a heat exchanger located axially between the inlet and the outlet. The heat exchanger system may include an ejector, a valve, and a controller. The ejector may be configured to inject secondary air into the outlet duct. The valve may be in fluid communication with the ejector. The controller may be connected with the valve. The controller may be configured to compare a pressure of an inlet of the bypass channel and a pressure of an outlet of the bypass channel. The controller may be configured to open the valve if the difference between the pressure of the inlet of the bypass channel and the pressure of the outlet of the bypass channel is less than or equal to a predetermined value. It may be that no portion of the heat exchanger system extends radially into the bypass channel.

According to another aspect of the present disclosure, a method may include providing a gas turbine engine. The gas turbine engine may have an engine core and a bypass duct arranged around the engine core. The bypass duct may define a bypass channel. The engine core may include a compressor, a combustor, and a turbine. The method may include conducting a stream of bypass air through the bypass channel. The method may include conducting a portion of the bypass air into an inlet duct of a heat exchanger system. The heat exchanger system may be positioned radially inward of a radially inner boundary of the bypass channel. The method may include transferring heat to the portion of the bypass air. The method may include conducting the portion of the bypass air back into the bypass channel via an outlet duct of the heat exchanger system. In this way, the heated portion of the bypass air may provide thrust for propelling the gas turbine engine.

In some embodiments, conducting a portion of the bypass air into an inlet duct of a heat exchanger system may include passing air radially inwardly across the radially inner boundary of the bypass channel. Conducting the portion of the bypass air back into the bypass channel via an outlet duct of the heat exchanger system may include passing air radially outwardly across the radially inner boundary of the bypass channel. The method may further comprise injecting air from the engine core into the outlet duct.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

Figure 1:
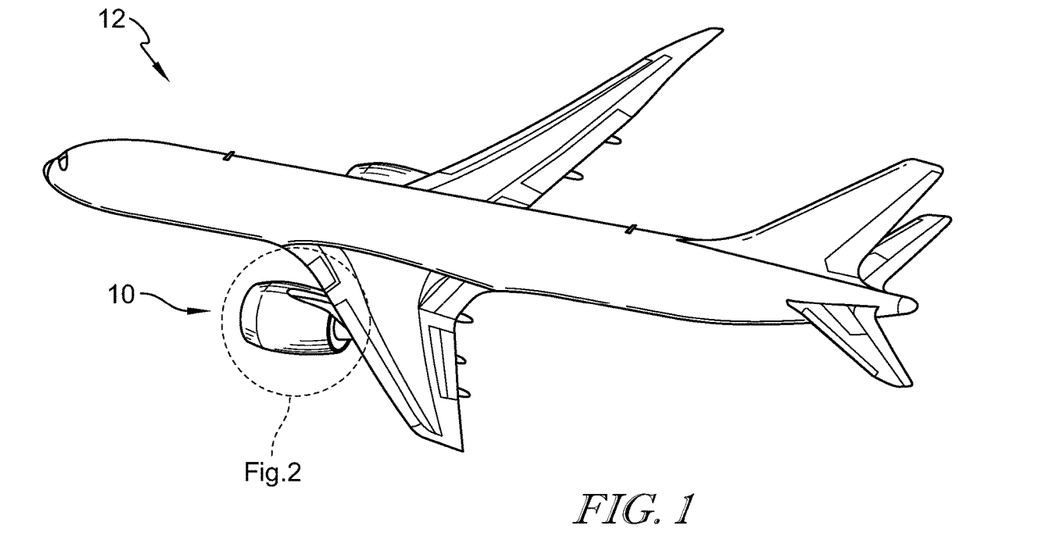
FIG. 1 is a perspective view of a gas turbine engine in accordance with the present disclosure showing that the gas turbine engine is coupled to the body of an aircraft to produce thrust for propelling the aircraft.
Figure 2:
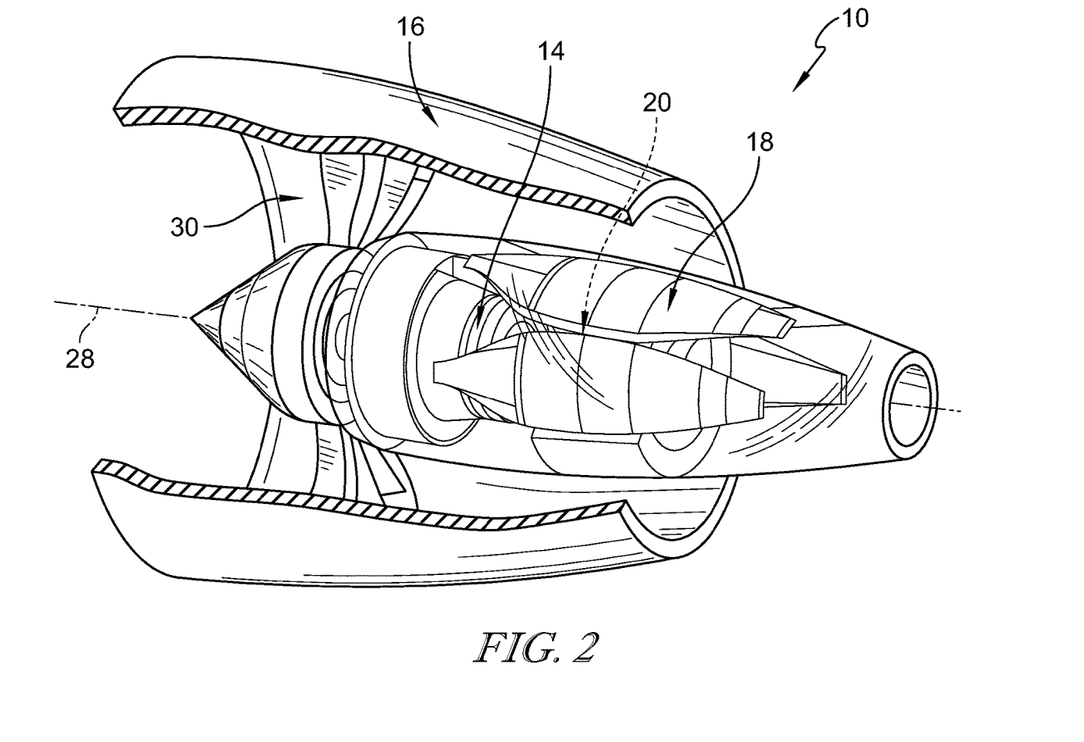
FIG. 2 is an enlarged cut-away perspective view of the gas turbine engine in the dashed region of FIG. 1 showing that the gas turbine engine includes a fan and an engine core arranged axially along an axis, a bypass duct arranged circumferentially around the fan to define a bypass channel, and a heat exchanger system located radially between the engine core and the bypass duct to minimize obstruction of the bypass channel.
Figure 3:
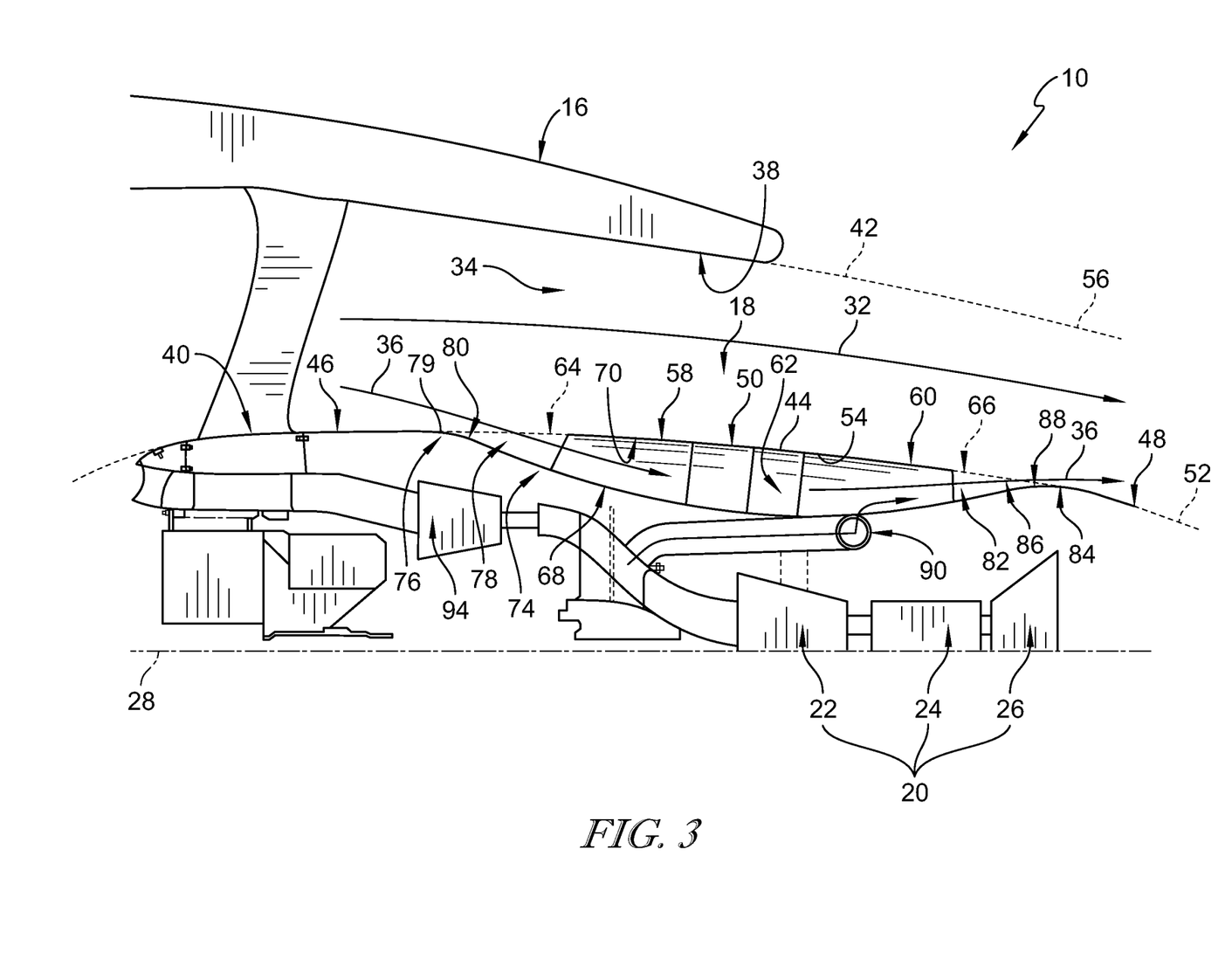
FIG. 3 is a section view of the gas turbine engine of FIG. 2 showing that the gas turbine engine includes the bypass duct arranged circumferentially around the engine core to define the bypass channel and the heat exchanger system located radially between the bypass channel and the engine core and configured to receive bypass air from the bypass channel, transfer heat to the bypass air, and conduct heated bypass air back to the bypass channel so that the heated air is still usable as thrust for the aircraft.

A gas turbine engine 10 in accordance with the present disclosure is adapted for use with an aircraft 12 and includes a power system 14, a bypass duct 16, and a heat exchanger system 18, as shown in FIGS. 1 and 2. The power system 14 includes an engine core 20 having a compressor 22, a combustor 24, and a turbine 26 each arranged axially along an axis 28, as shown in FIG. 3. The engine core 20 also includes a fan 30 coupled with the engine core 20 and configured to be driven by the engine core 20 to produce bypass air 32 that provides thrust for propelling the gas turbine engine 10 during operation of the gas turbine engine 10.

The bypass duct 16 is arranged circumferentially around the engine core 20 of the power system 14 to define a bypass channel 34, as shown in FIG. 3. The bypass channel 34 is arranged to conduct the bypass air 32 around the engine core 20 during operation of the gas turbine engine 10.

The heat exchanger system 18 is located radially between the bypass duct 16 and the engine core 20 as shown in FIG. 3. Illustratively, the heat exchanger system 18 is located radially between the bypass channel 34 and the engine core 20 such that no portion of the heat exchanger system 18 extends into the bypass channel 34, as shown in FIGS. 2 and 3. The heat exchanger system 18 is configured to receive a portion 36 of the bypass air 32 from the bypass channel 34, transfer heat from the engine core 20 to the portion 36 of the bypass air 32, and conduct the portion 36 of the bypass air 32 back into the bypass channel 34. In this way, after heating the portion 36 of the bypass air 32, the heat exchanger system 18 is configured to conduct the portion 36 of the bypass air 32 back into the bypass channel 34 to provide thrust for propelling the gas turbine engine 10.

The bypass duct 16 includes a radially outer wall 38 and a radially inner wall 40 spaced apart from and radially inward of the radially outer wall 38 relative to the axis 28, as shown in FIG. 3. The radially outer wall 38 defines an outer boundary 42 of the bypass channel 34 and the radially inner 40 wall defines an inner boundary 44 of the bypass channel 34.

The radially inner wall 40 includes a first portion 46, a second portion 48, and a third portion 50, as shown in FIG. 3 The second portion 48 is spaced apart axially from and aft of the first portion 46. The third portion 50 is positioned axially between and spaced axially apart from the first portion 46 and the second portion 48. The first portion 46, the second portion 48, and the third portion 50 of the radially inner wall 40 are arranged along a continuous, common arc 52 and cooperate to define the inner boundary 44 of the bypass channel 34 along the common arc 52. In some embodiments, the third portion 50 of the radially inner wall 40 defines a radially outer boundary 54 of the heat exchanger system 18. In some embodiments, the heat exchanger system 18 defines some or the entire third portion 50.

The radially outer wall 38 of the bypass duct 16 extends along a continuous, second arc 56 located radially outward of the common arc 52, as shown in FIG. 3. In some embodiments, the radially outer wall 38 extends along only a portion of the outer boundary 42, and the outer boundary 42 extends in the aft direction axially beyond the radially outer wall 38 along the second arc 56. The inner boundary 44 and the outer boundary 42 define the bypass channel 34 and interact with the bypass air 32 flowing through the bypass channel 34.

The heat exchanger system 18 is located radially between the inner boundary 44 of the bypass channel 34 and the engine core 20, as shown in FIG. 3. In some embodiments, no portion of the heat exchanger system 18 extends radially outward beyond the inner boundary 44 of the bypass channel 34 into the bypass channel 34. In some embodiments, the inlet duct 64 includes a small scoop protruding radially outward into the bypass channel 34 to increase the flow of bypass air 36 through the heat exchanger system 18.

The heat exchanger system 18 includes an inlet duct 58, an outlet duct 60 positioned axially aft of the inlet duct 58, and a heat exchanger 62 coupled axially between the inlet duct 58 and the outlet duct 60. The inlet duct 58 opens radially outwardly into the bypass channel 34 to define an inlet 64 arranged along the inner boundary 44. The inlet duct 58 is located radially inward of the bypass duct 16 such that the inlet 64 is a submerged inlet 64 of the heat exchanger system 18. The outlet duct 60 opens radially outwardly into the bypass channel 34 to defines an outlet 66 arranged along the inner boundary 44. The outlet duct 60 is located radially inward of the bypass duct 16 such that the outlet 66 is a submerged outlet 66 of the heat exchanger system 18. In some embodiments, the inlet 64 and the outlet 66 of the heat exchanger system 18 cooperate with the portions 46, 48, 50 of the radially inner wall 40 to define the inner boundary 44 of the bypass channel 34.

The heat exchanger system 18 also includes a radially inner wall 68 positioned radially outward of the engine core 20 and a radially outer wall 70 spaced radially outwardly from the radially inner wall 68, as shown in FIG. 3. The radially outer wall 70 extends in the aft direction from the inlet 64 to the outlet 66 of the heat exchanger system 18. In some embodiments, the radially outer wall 70 defines the outer boundary 54 of the heat exchanger system 18. In some embodiments, the radially outer wall 70 extends along the radially inner boundary 44 of the bypass channel 34. In some embodiments, the radially outer boundary 54 of the heat exchanger system 18 is the radially inner boundary 44 of the bypass channel 34. In some embodiments, the radially outer wall 70 of the heat exchanger system 18 is the radially inner wall 40 of the bypass duct 16.

Figure 4:
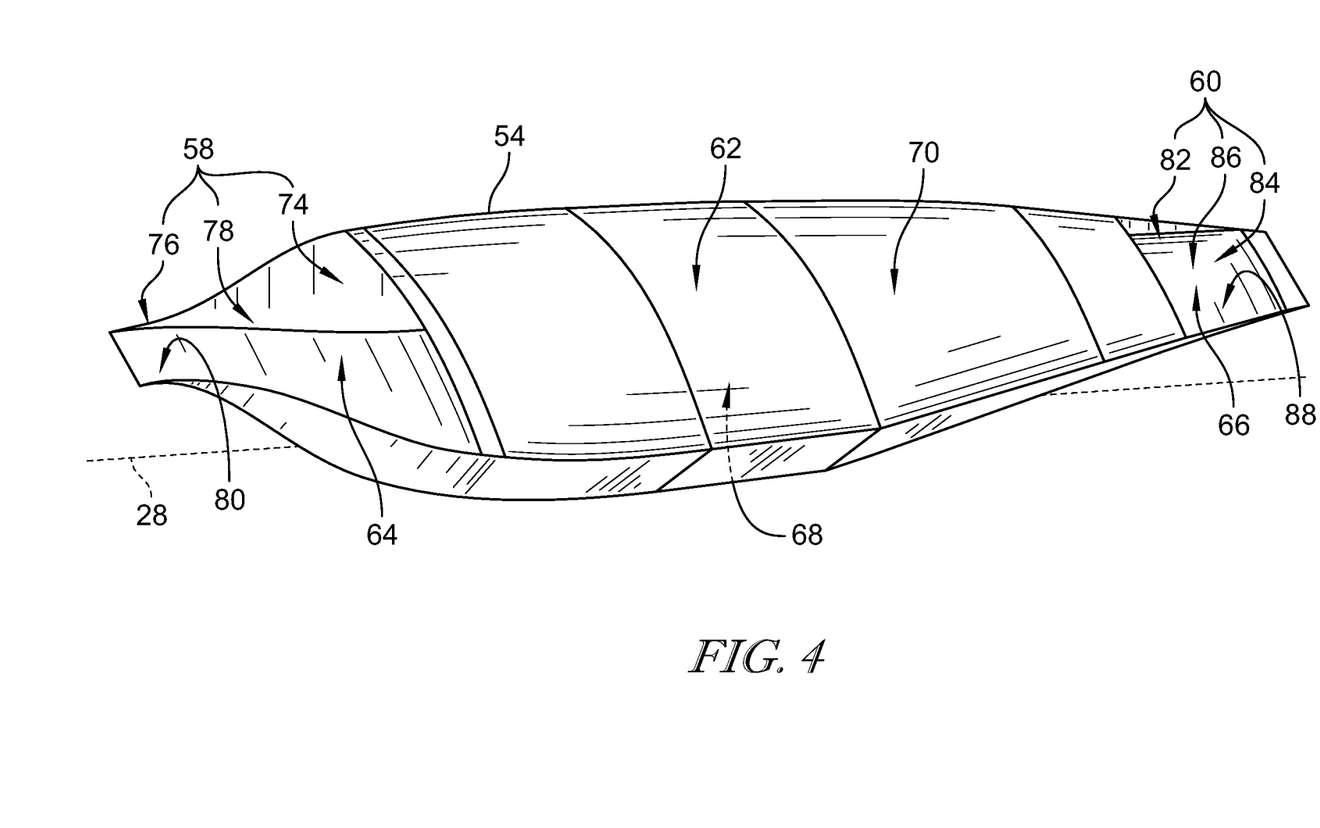
FIG. 4 is a perspective view of the heat exchanger system of FIG. 3 showing that the heat exchanger system includes an inlet duct that defines an inlet of the heat exchanger system, a heat exchanger coupled with the inlet duct, and an outlet duct coupled with the heat exchanger that defines an outlet of the heat exchanger system.

The inlet duct 58 includes an aft end 74 coupled with the heat exchanger 62 and a fore end 76 space axially forward of the aft end 74, as shown in FIGS. 3 and 4. The inlet duct 58 also includes a body 78 that extends from the fore end 76 of the inlet duct 58 in the aft direction and radially inwardly toward the axis 28 to the aft end 74 of the inlet duct 58. In some embodiments, the aft end 74 of the inlet duct 58 does not extend radially outwardly away from the axis 28 beyond a radially outermost point 79 of the fore end 76 of the inlet duct 58. In some embodiments, the radially outermost point 79 of the fore end 76 of the inlet duct 58 is the radially outermost point of the heat exchanger system 18. Illustratively, point 79 is tangent with the radially inner wall 40 and the fore end 76 of the inlet duct 58. In other embodiments, the fore end 76 of the inlet duct 58 does extend radially outward beyond point 79 and into the bypass channel 34.

In some embodiments, the inlet 64 spans axially across a space in the aft direction without extending radially outwardly as it spans axially across the space in the aft direction. In some embodiments, the inlet duct 58 is a NACA type inlet. In some embodiments, the NACA type submerged inlet creates counter-rotating vortices which deflect a boundary layer of slow-moving air away from the inlet 64 and draw the faster-moving air into the inlet duct 58, while avoiding the excess drag and flow separation that can occur with inlets that protrude radially outwardly into an ambient flow path, for example, the bypass channel 34.

The fore end 76 of the inlet duct 58 includes a convex inner wall 80 that faces toward the bypass channel 34 and is substantially tangent with the radially inner wall 40 of the bypass duct 16, as shown in FIGS. 3 and 4. The inlet duct 58 diverges as it extends in the aft direction. In some embodiments, a diffuser may be included in the inlet duct 58. In some embodiments, a diffuser may be located axially between inlet duct 58 and the heat exchanger 62.

The outlet duct 60 of the heat exchanger system 18 includes a fore end 82 coupled with the heat exchanger 62 and an aft end 84 space axially aft of the fore end 82, as shown in FIGS. 3 and 4. The outlet duct 60 also includes a body 86 that extends from the fore end 82 of the outlet duct 60 in the aft direction and radially outwardly away from the axis 28 to the aft end 84 of the outlet duct 60. The aft end 84 includes a convex inner wall 88 that faces toward the bypass channel 34 and is substantially tangent with the radially inner wall 40 of the bypass duct 16. As shown in FIG. 4, the outlet duct 60 converges as it extends in the aft direction. In some embodiments, a nozzle may be included in the outlet duct 60. In some embodiments, a nozzle may be located axially between outlet duct 60 and the heat exchanger 62. In some embodiments, the outlet duct 60 extends radially outward and into the bypass channel 34.

Figure 5:
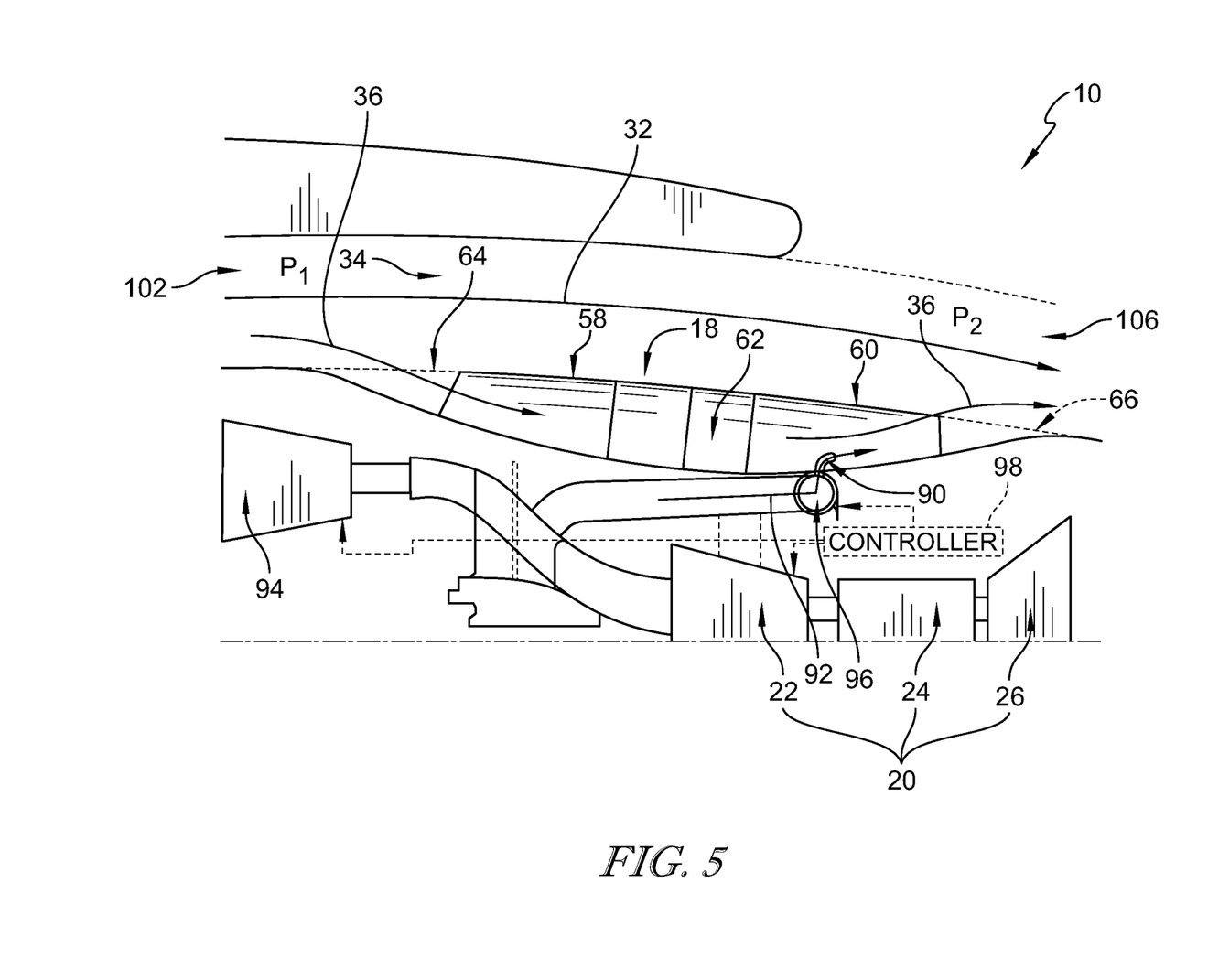
FIG. 5 is an enlarged section view of the gas turbine engine of FIG. 2 showing that the heat exchanger system includes an ejector fluidly coupled with the engine core and configured to inject blead air selectively from the engine core into the outlet duct of the heat exchanger system.

In some embodiments, as shown in FIG. 5, the heat exchanger system 18 includes an ejector 90 configured to inject bleed air 92 from the engine core 20, also known as secondary air 92, into the outlet duct 60. The injection of secondary air 92 into the outlet duct 60 increases the mass of the flow of air 36 received by the inlet duct 58 and conducted through the heat exchanger system 18. In some embodiments, the ejector 90 is fluidly and directly connected with the compressor 22, and the secondary air 92 is bleed air supplied by the compressor 22. In some embodiments, the ejector 90 is fluidly connected with a booster compressor 94 positioned upstream of the compressor 22, and the secondary air 92 is bleed air supplied by the booster compressor 94.

In some embodiments, the heat exchanger system 18 includes a valve 96 and a controller 98, as suggested by FIG. 5. The valve 96 is in fluid communication with the ejector 90 and the compressor 22 or the booster compressor 94. The controller 98 is electrically connected with the valve 96. The controller 98 is configured to compare a pressure P1 of an inlet 102 of the bypass channel 34 with a pressure P2 of an outlet 106 of the bypass channel 34. The controller 98 is configured to open the valve 96 if the difference between the pressure P1 and the pressure P2 is less than or equal to a predetermined value. The controller 98 is configured to close the valve 96 if the difference between the pressure P1 and the pressure P2 is greater than a predetermined value.

In some embodiments, the heat exchanger system 18 includes the valve 96, as suggested by FIG. 5. The valve 96 is in fluid communication with the ejector 90 and the compressor 22 or the booster compressor 94. The valve 96 is configured to yield in response to a pressure differential existing on opposing sides on the valve 96. In some embodiments, the valve 96 may be biased to a closed position to prevent mixing or combined flow of separate volumes of pressurized air located on opposing sides of the valve 96.

Figure 6:
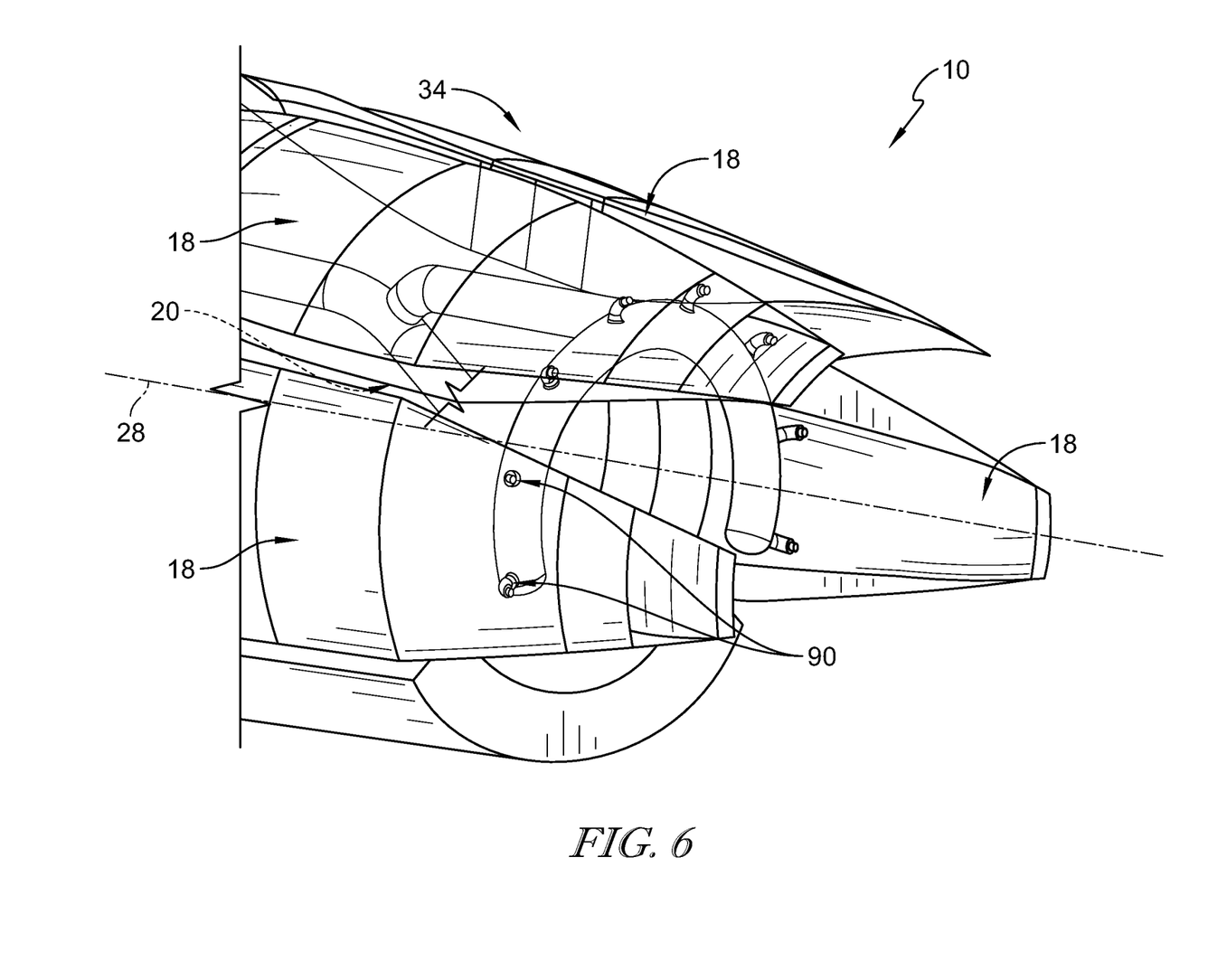
FIG. 6 is a perspective view of an aft portion of the gas turbine engine of FIG. 2 showing that the gas turbine engine includes a plurality of heat exchanger systems made transparent to show that pairs of ejectors of the heat exchanger systems are directly and fluidly coupled to a corresponding outlet duct of each heat exchanger system.

In some embodiments, the gas turbine engine 10 includes a plurality of heat exchanger systems 18. Each heat exchanger system 18 includes the features, positioning, orientations of the heat exchanger system 18 described above. As shown in FIG. 6, the plurality of heat exchanger systems 18 are arranged circumferentially around the axis 28. The plurality of heat exchanger systems 18 are arranged in an annular orientation to form a ring or a partial ring extending around the axis 28.

In the illustrative example shown in FIG. 6, the plurality of heat exchanger systems 18 includes four heat exchanger systems 18. The number of heat exchanger systems 18 included in the gas turbine engine 10 functions to maximize cooling given, among other factors: (i) the desired dimensions of the diverging and converging portions of the heat exchanger system 18 and (ii) the available space provided in the axial direction, and the available space provided between the engine core 20 and the bypass duct 16 of the gas turbine engine 10.

In some embodiments, the heat exchanger system 18 includes a pair of ejectors 90. Each ejector 90 is configured to inject bleed air 92 from the engine core 20 into the outlet duct 60 of the heat exchanger system 18. In the illustrative example shown in FIG. 6, the gas turbine engine 10 includes a plurality of pairs of ejectors 90. Each pair of ejectors 90 is coupled in fluid and direct communication with a corresponding heat exchanger system 18 and configured to supply bleed air 92 from the engine core 20 to the corresponding heat exchanger system 18.

New gas turbine engine designs may increase the cooling system demands on the dissipation of excess heat created by current or new energy conversion processes. In an outboard nacelle mounted engine, for example, the gas turbine engine 10 used in an application with a typical commercial airliner, it may be beneficial to maintain engine systems collocated with the gas turbine engine 10. Alternatively, fluid and electrical systems may be routed away from the engine, where more space may be available. However, this arrangement may have an undesirable impact to the customer interface complexity, space availability in the struts, outer bypass region (also known as the bypass channel 34), nacelle, etc.

Available space within the immediate area surrounding the engine core 20 may be limited. A thermal management solution residing within this zone should make efficient use of available space. Disclosure of this application may include a compact fluid-to-air heat exchanger solution where one or more heat exchangers 62 and their associated air ducting 58, 60 are located within the inner bypass duct (IBD), also known as the space between the engine core 20 and the bypass channel 34.

To minimize intrusion into the engine core space, the heat exchangers 62 may follow the inner profile of the inner bypass duct. The heat exchangers 62 may be mounted flush with or very close to flush with the inner bypass duct, or the heat exchangers 62 and inlet/outlet ducting may share an integral wall 70 with the inner bypass duct to optimize the use of space. Mounting the heat exchanger system 18 flush with the inner bypass duct may have the additional effect of minimizing negative impact to fan thrust performance due to the streamline nature of the diverted airflow 36 used for heat exchange.

The diverted airflow 36 may then be injected back into the bypass fan stream, also known as the bypass channel 34. Ducting the air 36 back into the fan stream (bypass channel 34) may allow incorporation of a compressor-powered ejector system, including the ejector 90, to boost heat exchanger performance; however, this may not be used for all applications. If the temperature and available space allows, air 36 exiting the heat exchanger system 18 may be allowed to flow openly within the inner bypass duct past the hot section of the gas turbine engine 10, where it may then exit into the exhaust stream to add to the thrust instead of flowing into the bypass fan stream (also known as the bypass channel 34).

Heat exchanger cooling power may be influenced by cooling air mass flow, which varies depending on engine operating conditions. As mentioned above, bleed air 92 bled from the compressor (22, 94) may be used to power ejectors 90 to 'pull' air through the heat exchanger system 18 during certain conditions where the pressure ratio between the inlet 64 and outlet 66 ports is low. Ejectors 90 may be used to draw cool low pressure air from the inner bypass duct and through the heat exchanger system 18 and reinsert it into the bypass flow in the bypass channel 34. The ejector nozzle or ejector 90 (high pressure source) may be supplied by bleed air 92 from the intermediate compressor, the booster compressor 94, and/or the high pressure compressor(s) including at least the compressor 22.

During some operating conditions, the ejectors 90 may not be switched 'on' because the pressure at the inlet 64 of the conforming inlet duct 58 is sufficiently high due fan pressure ratio and Mach number. The ejectors 90 may be configured to be switched 'off' in order to reduce compressor bleed and improve cyclic efficiency.

The reliability of bleed flow valves may suffer to due excessive heat from non-ideal mounting arrangements and contamination that interferes with moving parts. Fluidic devices may be used to reduce compressor bleed flow used to cool the turbine components during certain cruise conditions in order to improve cyclic efficiency. Fluidic devices may be used as the valve 96. The fluidic devices may contain vortex amplifiers that are configured to operate by using higher pressure source of bleed flow, which is referred to as control air and is supplied from a higher compressor stage than the ejector flow). The control air source may be connected remotely by a solenoid to the vortex amplifier. The flow regime may be such that the bleed air flow is significantly reduced, and the control air, is consumed minimally such that the net change to the engine cycle remains favorable.

The high pressure or primary air source of the ejector 90 may modulated by the fluidic device. A change in primary ejector airflow may significantly alter the lower pressure or secondary cool air flow.

In gas turbine applications, ejectors may be used to provide motive force to draw air through heat exchangers on applications where large volumes of pressurized bypass air are not present (i.e. turbo-props). For turbofan installations, heat exchangers tend to be "matrix" type where air is taken off the outer bypass duct, drawn through the heat exchanger, and exhausted to a low pressure source such as to atmosphere. These designs may not feature ideal inlet geometry. Furthermore, the air may be exhausted overboard where the airflow and added heat from the oil cannot be recaptured as thrust in the nozzle. In illustrative embodiments, the inlet geometry of the present disclosure recaptures a material fraction of total pressure and conducts the flow back to the bypass duct to be used as thrust instead of being exhausted overboard. In some examples, the inlet geometry may be NACA type.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine adapted for use with an aircraft, the gas turbine engine comprising
   a power system that includes an engine core having a compressor, a combustor, and a turbine arranged axially along an axis and a fan coupled with the engine core and configured to be driven by the engine core to produce bypass air that provides thrust for propelling the gas turbine engine during operation of the gas turbine engine,
   a bypass duct arranged circumferentially around the engine core to define a bypass channel arranged to conduct the bypass air around the engine core during operation of the gas turbine engine, the bypass duct having a radially outer wall that defines an outer boundary of the bypass channel and a radially inner wall spaced apart radially from the radially outer wall relative to the axis to define an inner boundary of the bypass channel, and
   a heat exchanger system located radially between the inner boundary of the bypass channel and the engine core such that no portion of the heat exchanger system extends into the bypass channel and the heat exchanger system configured to receive a portion of the bypass air from the bypass channel through an inlet duct, transfer heat to the portion of the bypass air, and conduct the portion of the bypass air through an outlet duct back into the bypass channel so that the heated portion of the bypass air provides some of the thrust for propelling the gas turbine engine, and
   a plurality of ejectors connected to a manifold and disposed in the outlet duct,
   wherein each of the plurality of ejectors is configured to inject secondary air into the outlet duct to increase the mass flow of air included in the portion of the bypass air received by the inlet duct and conducted through the heat exchanger system.

2. The gas turbine engine of claim 1, wherein the inlet duct includes a fore end that is tangent with the radially inner wall of the bypass duct, an aft end coupled with the heat exchanger, and an inlet duct body that extends from the fore end of the inlet duct in the aft direction and radially inwardly toward the axis to the aft end of the inlet duct.

3. The gas turbine engine of claim 2, wherein the outlet duct includes a fore end coupled with the heat exchanger, an aft end that is tangent with the radially inner wall of the bypass duct, and an outlet duct body that extends from the fore end of the outlet duct in the aft direction and radially outwardly away from the axis to the aft end of the outlet duct.

4. The gas turbine engine of claim 1, wherein the ejector is fluidly connected with the compressor and the secondary air is bleed air from the compressor.

5. The gas turbine engine of claim 4, further comprising a valve in fluid communication with the ejector and the compressor and a controller connected with the valve and the controller is configured to compare a pressure of an inlet of the bypass channel and a pressure of an outlet of the bypass channel and to open the valve if the difference between the pressure of the inlet of the bypass channel and the pressure of the outlet of the bypass channel is less than or equal to a predetermined value.

6. The gas turbine engine of claim 5, wherein the controller is configured to close the valve if the difference between the pressure of the inlet of the bypass channel and the pressure of the outlet of the bypass channel is greater than the predetermined value.

7. The gas turbine engine of claim 1, wherein the heat exchanger includes a radially outer wall that forms a portion of the radially inner wall of the bypass duct such that the heat exchanger defines a portion of the inner boundary of the bypass channel.

8. The gas turbine engine of claim 1, wherein the inlet duct is located radially inward of the bypass channel and defines an inlet that opens radially outwardly into the bypass channel and the outlet duct is located radially inward of the bypass channel and defines an outlet that opens radially outwardly into the bypass channel,
   wherein the inlet duct diverges circumferentially as it extends in an aft direction and the outlet duct converges circumferentially as it extends in the aft direction, and
   wherein aft of a radially outermost point of the inlet duct, the radially inner wall of the bypass duct extends radially inward such that the radially outermost point of the inlet duct is the radially outermost point of the heat exchanger system.

9. A gas turbine engine adapted for use with an aircraft, the gas turbine engine comprising
   an engine core arranged axially along an axis, the engine core including a compressor, a combustor, and a turbine,
   a bypass duct arranged circumferentially around the engine core to define a bypass channel arranged to conduct bypass air around the engine core, the bypass duct having a radially outer wall that defines the outer boundary of the bypass channel and a radially inner wall spaced apart radially from the radially outer wall relative to the axis to define a first portion of an inner boundary of the bypass channel, and a plurality of heat exchanger systems each formed to define an inlet duct configured to receive the bypass air and an outlet duct located axially aft of the inlet duct and configured to conduct the bypass air out of the heat exchanger system and into the bypass channel, the inlet duct and the outlet duct of each heat exchanger system defines a second portion of the inner boundary of the bypass channel, and the plurality of heat exchanger systems being arranged circumferentially around the axis, and a plurality of ejectors connected to a manifold and disposed in the outlet duct, wherein each of the plurality of ejectors is configured to inject secondary air into the outlet duct to increase the mass flow of air included in the portion of the bypass air received by the inlet duct and conducted through the heat exchanger system.

10. The gas turbine engine of claim 9, wherein no portion of the inlet duct of each of the plurality of heat exchanger systems extends radially outward into the bypass channel.

11. The gas turbine engine of claim 9, wherein the heat exchanger of each of the plurality of heat exchanger systems includes a radially outer wall that defines a segment of the second portion of the inner boundary.

12. The gas turbine engine of claim 9, further including a valve in fluid communication with at least one of the plurality of ejectors, and a controller connected with the valve and the controller is configured to compare a pressure of an inlet of the bypass channel and a pressure of an outlet of the bypass channel and to open the valve if the difference between the pressure of the inlet of the bypass channel and the pressure of the outlet of the bypass channel is less than or equal to a predetermined value.

13. The gas turbine engine of claim 9, wherein no portion of the plurality of heat exchanger systems extend radially into the bypass channel.

14. The gas turbine engine of claim 9, wherein the radially inner wall of the bypass duct extends radially inward aft of a radially outermost point of the fore end of the inlet duct such that the radially outermost point of the fore end of the inlet duct is the radially outermost point of the heat exchanger system.

15. The gas turbine engine of claim 9, wherein the inlet duct diverges circumferentially as it extends in an aft direction and the outlet duct converges circumferentially as it extends in the aft direction.

16. A method comprising:

providing a gas turbine engine having an engine core arranged axially along an axis and a bypass duct arranged around the engine core to define a bypass channel, the engine core including a compressor, a combustor, and a turbine, conducting a stream of bypass air through the bypass channel, conducting a portion of the bypass air into an inlet duct of a heat exchanger system, the heat exchanger system positioned radially inward of a radially inner boundary of the bypass channel, and the inlet duct diverges circumferentially as the inlet duct extends in an aft direction, transferring heat to the portion of the bypass air, injecting secondary air via a plurality of ejectors into an outlet duct of the heat exchanger system to increase the mass flow of air included in the portion of the bypass air received by an inlet duct of the heat exchanger system, said plurality of ejectors connected to a manifold and disposed within the outlet duct, and conducting the portion of the bypass air back into the bypass channel via the outlet duct so that the heated portion of the bypass air provides thrust for propelling the gas turbine engine, and the outlet duct converges circumferentially as the outlet duct extends in the aft direction.

17. The method of claim 16, wherein the step of conducting a portion of the bypass air into an inlet duct of a heat exchanger system includes passing air radially inwardly across the radially inner boundary of the bypass channel and the step of conducting the portion of the bypass air back into the bypass channel via an outlet duct of the heat exchanger system includes passing air radially outwardly across the radially inner boundary of the bypass channel.

18. The gas turbine engine of claim 16, wherein the heat exchanger system includes a heat exchanger located axially between the inlet duct and the outlet duct and the heat exchanger includes a radially outer wall that forms a portion of the radially inner wall of the bypass duct such that the heat exchanger defines a portion of the inner boundary of the bypass channel.

* * * * *